Figure 2:
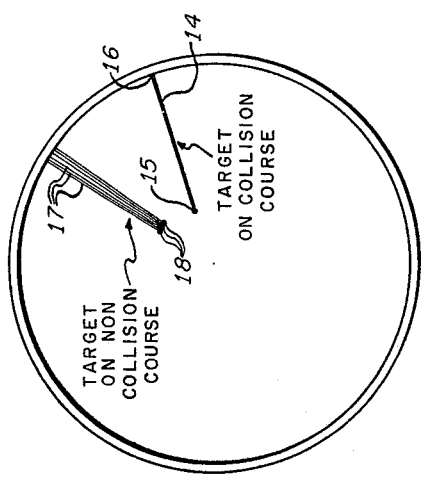

Aug. 16, 1966    R. F. RIGGS    3,267,470
RADIALLY INTENSIFIED PPI COLLISION COURSE DETECTOR
Filed Dec. 11, 1964

INVENTOR.
ROBERT F. RIGGS
BY Robert J. Haase
ATTORNEY

3,267,470
RADIALLY INTENSIFIED PPI COLLISION COURSE DETECTOR

Robert F. Riggs, Charlottesville, Va., assignor to Sperry Rand Corporation, Great Neck, N.Y., a corporation of Delaware
Filed Dec. 11, 1964, Ser. No. 417,711
7 Claims. (Cl. 343—11)

The present invention generally relates to target indicators and, more particularly, to a plan position indicator specially adapted for the representation of targets by radially intensified lines, one terminous of which represents target range and the direction of which represents target bearing.

Efforts are constantly being made toward the realization of a target indicator which presents target data in such a manner that collision hazard would be easily recognizable. It is desirable, of course, that the target indicator being sought also provide a maximum of data on all targets simultaneously but not at the cost of extensive modification of time-proven and accepted systems.

One object of the present invention is to provide a target display wherein representations of targets on collision courses are emphasized relative to representations of targets on non-collision courses.

Another object is to provide a display of target data on all targets simultaneously in such a manner that targets on collision course are readily distinguished from all others.

A further object is to provide a display of range and bearing data on all targets with distinguishable emphasis being given to those targets on collision course.

These and other objects of the present invention, as will appear from a reading of the following specification, are accomplished in a preferred embodiment by the provision of a pulsed radar system equipped with a plan position indicator having a specially designed beam intensification circuit. The beam intensification circuit comprises a threshold circuit for inhibiting response to noise-like signals below the level of desired target echo signals, a pulse stretching circuit and a summing circuit for additively combining the target echo signals and the signals at the output of the pulse stretching circuit. The combined signals are applied to the beam intensification electrode of the PPI cathode ray tube. In the preferred embodiment, the pulse stretching circuit comprises a conventional flip-flop which is turned "on" by a target echo signal and is turned "off" synchronously with the termination of the range sweep interval in which said echo signal occurs. Consequent to the use of the flip-flop, the target representation displayed on the PPI is in the form of a radial line having a direction corresponding to the target azimuth, an inner terminous corresponding to target radial range, and an outer terminous at the periphery of the viewing surface of the PPI.

In operation, the threshold circuit is adjusted to prevent most clutter and noise spikes from exceeding the threshold while allowing target echo signals to exceed the threshold. Preferably, the radar receiver includes an instantaneous automatic gain control circuit to maintain the average detected noise and clutter level substantially constant during each range sweep. Additionally, the radar antenna is scanned at a rate rapid enough so that the scanning period is considerably less than the target display scope decay time. When a receive target echo signal exceeds the threshold, the flip-flop is triggered into its "on" state. The "on" state output signal of the flip-flop brightens or intensifies the trace of the display scope beam. At the end of each range sweep, the flip-flop is returned to its "off" state by the trigger derived from the "fly-back" portion of the range sweep sawtooth. The result is that target echo signals cause a brightening of the radial sweep line from a point corresponding to actual target range continuously out to the range limit of the display scope face.

In the event that a particular target remains at the same relative bearing for several consecutive scanning periods of the antenna, the brightened radial traces corresponding to said target overlap to cause an "integration" and further brightening of the radial trace along a line corresponding to the bearing of said target. On the other hand, if a particular target changes bearing between consecutive scans of the antenna, there is little or no overlap of the consecutively produced radial traces and, consequently, little or no integration. The result is that targets on-collision course are represented by radial lines which are intensified to a distinguishably higher brightness level relative to the representations of targets on non-collision courses.

In an optional embodiment of the invention, provision is made for actuating the flip-flop only once during each antenna scanning interval. In this way, all targets are represented by a single radial trace at the azimuth at which the target intercepts the leading edge of the scanning radar beam. The optional modification prevents the angular broadening of a target representation (due to target size and range) to yield better defined target representations.

Figure 1:
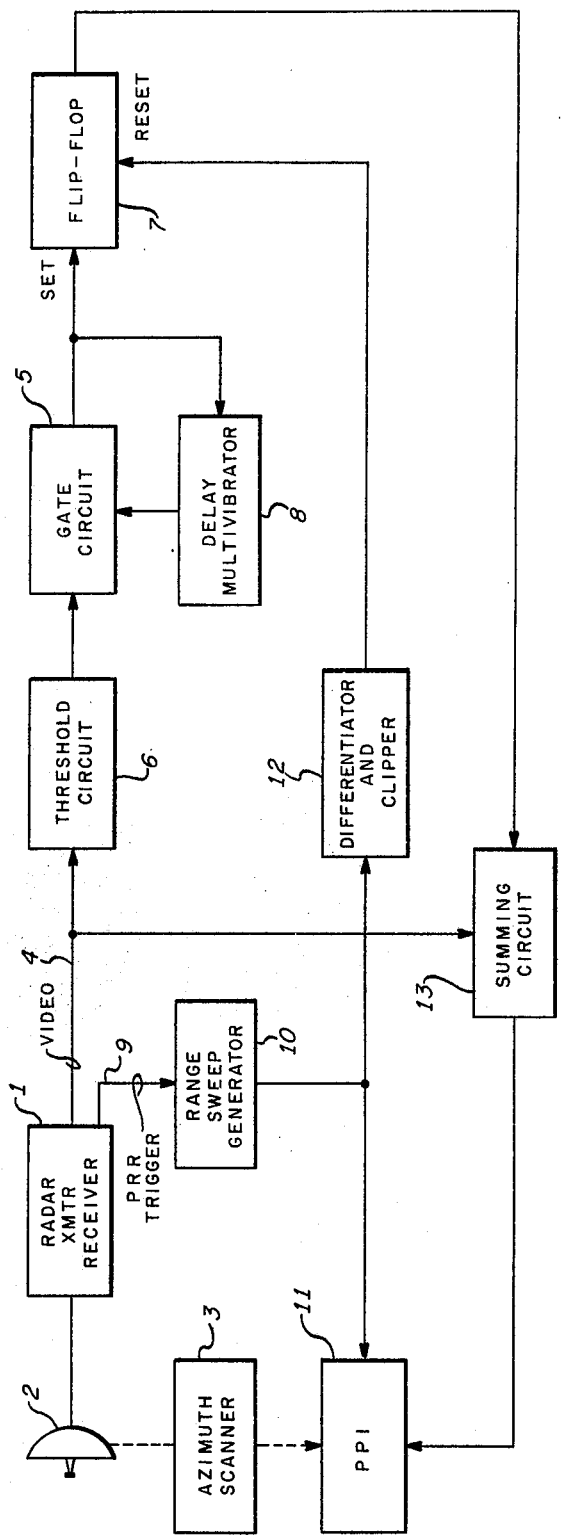

For a more complete understanding of the present invention, reference should be had to the following specification and to the appended figures of which:

FIG. 1 is a simplified block diagram of a preferred embodiment of the invention; and FIG. 2 is a representative scope display provided by the embodiment of FIG. 1.

Referring to FIG. 1, a conventional pulse radar transmitter receiver is represented by the numeral 1. Pulses of microwave energy are radiated by antenna 2 in a continuously changing direction determined by azimuth scanner 3. Target echo signals returning to antenna 2 are detected within receiver 1 and made available on line 4 as target video signals in a conventional manner. It is preferred that the receiver of radar transmitter-receiver 1 be equipped with a standard instantaneous automatic gain control circuit so that the average detected noise and clutter signal level is maintained relatively constant. The detected target video signals are applied to gate circuit 5 via threshold circuit 6. The threshold level of circuit 6 is adjusted so that most clutter and noise spikes issuing from the receiver 1 fall below the threshold while desired target echo signals exceed the threshold and are applied to gate circuit 5. Threshold circuits and their design are well established in the art and will not be discussed here. A suitable threshold circuit comprises a back-biased diode whose threshold of conduction is established by the magnitude of the back-bias.

Gate circuit 5 is normally conductive. Target echo signals passing through circuit 5 are applied to the "set" input terminal of flip-flop 7 and to the input of delay multivibrator 8. Multivibrator 8 may be a monostable multivibrator whose quiescent stable output permits the conduction of gate circuit 5. Upon the application of a target echo pulse, however, multivibrator 8 is triggered to its quasi-stable state in which it produces an output signal which renders gate circuit 5 temporarily non-conductive. Multivibrator 8 automatically reverts to its quiescent state after a predetermined time interval to again allow the normal conduction of gate circuit 5. The delay of multivibrator 8, i.e., the length of time that it remains in its quasi-stable state, is made to exceed the known predictable time that the scanning radar beam is intercepted by a target during each of the successive scanning intervals. The result is that gate circuit 5 will pass only the first target echo signal received during each scanning interval whereby flip-flop 7 is "set" only once during each antenna scanning interval. As will be seen later, circuit 5 and multivibrator 8 may be omitted permitting the setting of flip-flop 7 a number of times during each scanning interval with a concomitant broadening of the displayed target representation but without undermining the usefulness of the display.

Transmitter-receiver 1 also provides on line 9 pulse repetition rate triggers for application to conventional range sweep generator 10. The sawtooth signal provided by generator 10 is applied to conventional PPI 11 for the radial deflection of its cathode ray beam. The range sawtooth also is applied to differentiator and clipper 12 which provides output pulses synchronously with the occurrence of the "fly-back" (end portion) of the range sawtooths. The output pulses are applied to the "reset" terminal of flip-flop 7. The output signal of flip-flop 7 is combined with the target video signals on line 4 by summing circuit 13. The combined signals are applied to the beam intensification electrode of PPI 11. The PPI beam is angularly deflected by scanner 3 synchronously with the scanning of antenna 2. It is preferred that the scanning rate be sufficiently high so that the scanning interval (the time required for one complete azimuth excursion of antenna 2) be small relative to the phosphor decay time of PPI 11. Such a relationship maintains the display target representations at a visible level of brightness during the interval between successive sweeps of the scanning radar beam through the position of the target.

The operation of the embodiment of FIG. 1 will be better understood by reference to a typical target display represented by FIG. 2. Each time that a target echo signal is received at an amplitude exceeding the established level of threshold circuit 6, flip-flop 7 is "set" to produce a radially intensified line such as line 14 having an inner terminous 15 at the actual range to the target and an outer terminous 16 at the periphery to the cathode ray tube face. Terminous 15 is emphasized by the target video pulses on line 4 which are combined within summing circuit 13 with the output of flip-flop 7. If optional gate circuit 5 and multivibrator 8 are omitted, a new radially intensified line is produced with each successive received target echo signal, flip-flop 7 being reset at the end of each ranging interval by the pulses from circuit 12. The result is that a succession of radial intensifications are produced during the entire interval that the radar beam is intercepted by the target. On the other hand, if circuit 5 and multivibrator 8 are used as shown, flip-flop 7 is set only upon the occurrence of the first target video pulse within each antenna scanning interval. Only a single radial intensification is produced for each target during each antenna scanning interval.

If a given target such as the target represented by the radial intensification 14 is traveling along a constant bearing course relative to own ship, i.e., a collision course, the succession radial intensifications will overlap each other to further enhance the brightness of the visible display. If the target is following a constantly changing bearing course relative to own ship (a non-collision course), however, a succession of radial intensifications such as intensifications 17 will be produced. The angular position of each intensification represents the relative bearing of the target during a respective antenna scanning interval. The changing of target bearing between antenna scanning intervals produces a "smeared" non-overlapping target representation whose apparent brightness is noticeably reduced relative to the brightness of radial line 14 representing a target on a collision course. The marked contrast between the non-collision and collision course target representations permits rapid appraisal by the radar operator-viewer of the potential collision hazard of all targets which intercept the scanning radar beam. Not only is collision hazard appraisal made rapidly but this is done without the obliteration of the desirable standard PPI target display which is still visibly present as line termini 15 and 18.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a plan position indicator system wherein target echo signals are represented by intensifications of a cathode ray tube beam and said system provides triggers for synchronizing the radial sweep of said beam, means for intensifying said beam comprising
 a bistable device having set and reset terminals,
 means for applying said echo signals to said set terminal,
 means responsive to said triggers for producing signals delayed with respect thereto, said delayed signals being applied to said reset terminal, and
 means for applying the output signal of said bistable device to the beam intensification means of said cathode ray tube.

2. Beam intensifying means as defined in claim 1 wherein said means for applying said echo signals to said set terminal comprises
 a normally conducting gate circuit, and
 means for temporarily inhibiting the conduction of said gate circuit upon the occurrence of a signal at the output thereof, said inhibiting means being connected to the output of said gate circuit,
 said gate circuit when conductive applying said echo signals to said set terminal.

3. Beam intensifying means as defined in claim 1 wherein said means for applying said echo signals to said set terminal comprises
 a normally conducting gate circuit, and
 a delay multivibrator, said multivibrator producing an output signal for a predetermined length of time following a triggering signal,
 said multivibrator being connected to the output of said gate circuit whereby said multivibrator is triggered by a signal at the output of said gate circuit,
 said output signal of said multivibrator being applied to said gate circuit for inhibiting the conduction thereof,
 said gate circuit when conductive applying said echo signals to said set terminal.

4. In a plan position indicator system wherein target echo signals are represented by intensifications of a cathode ray tube beam and said system provides triggers for synchronizing the radial sweep of said beam, means for intensifying said beam comprising
 a bistable device having set and reset terminals,
 means for applying said echo signals to said set terminal,
 means responsive to said triggers for producing signals delayed with respect thereto, said delayed signals being applied to said reset terminal, and
 a signal summing circuit,
 said echo signals and the output signal of said bistable device being applied to said circuit,
 the output of said circuit being connected to the beam intensification means of said cathode ray tube.

5. In a plan position indicator system wherein target echo signals are represented by intensifications of a cathode ray tube beam, said echo signals are received in the presence of undesired signals of generally lesser amplitude, and said system provides triggers for synchronizing the radial sweep of said beam, means for intensifying said beam comprising
 a bistable device having set and reset terminals,
 means including a threshold circuit for applying said echo signals to said set terminal,
 the threshold of said circuit being set above the average level of said undesired signals but below the level of said echo signals, means responsive to said triggers for producing signals delayed with respect thereto, said delayed signals being applied to said reset terminal, and means for applying the output signal of said bistable device to the beam intensification means of said cathode ray tube.

6. Beam intensifying means as defined in claim 5 wherein said means for applying said echo signals to said set terminal further includes a normally conducting gate circuit, and a delay multivibrator, said multivibrator producing an output signal for a predetermined length of time following a triggering signal, said multivibrator being connected to the output of said gate circuit whereby said multivibrator is triggered by a signal at the output of said gate circuit, said output signal of said multivibrator being applied to said gate circuit for inhibiting the conduction thereof, said gate circuit when conductive applying said echo signals to said set terminal.

7. In a plan position indicator system wherein target echo signals are represented by intensifications of a cathode ray tube beam, said echo signals are received in the presence of undesired signals of generally lesser amplitude, and said system provides triggers for synchronizing the radial sweep of said beam, means for intensifying said beam comprising a bistable device having set and reset terminals, means including a threshold circuit for applying said echo signals to said set terminal, the threshold of said circuit being set above the average level of said undesired signals but below the level of said echo signals, means responsive to said triggers for producing signals delayed with respect thereto, said delayed signals being applied to said reset terminal, and a signal summing circuit, said echo signals and the output signal of said bistable device being applied to said circuit, the output of said circuit being connected to the beam intensification means of said cathode ray tube.

No references cited.

CHESTER L. JUSTUS, *Primary Examiner.*

P. M. HINDERSTEIN, *Assistant Examiner.*